United States Patent [19]

Chino et al.

[11] Patent Number: 4,937,093
[45] Date of Patent: Jun. 26, 1990

[54] METHOD FOR MEASURING THICKNESS OF MAGNETIC RECORDING MEDIUM

[75] Inventors: Naoyoshi Chino; Shinji Saito; Toshihiko Miura, all of Kanagawa, Japan

[73] Assignee: Fuji Photo Film Co., Ltd., Kanagawa, Japan

[21] Appl. No.: 374,021

[22] Filed: Jun. 30, 1989

[30] Foreign Application Priority Data

Jul. 1, 1988 [JP] Japan .................. 63-162692

[51] Int. Cl.$^5$ .............................................. B05D 5/12
[52] U.S. Cl. .................................... 427/10; 427/44; 427/131; 427/132
[58] Field of Search ................. 427/127–132, 427/48, 36, 44, 10; 428/694, 900

Primary Examiner—Bernard Pianalto
Attorney, Agent, or Firm—Sughrue, Mion, Zinn, Macpeak & Seas

[57] ABSTRACT

A method for measuring the thickness of a multi-layer magnetic recording medium which provides a high accuracy and which can be used for continuous on-line monitoring of product thickness. First, first and second magnetic layers are simultaneously coated onto a running nonmagnetic support to form the recording medium. The first and second magnetic layers are made of materials having different responses to fluorescent X-rays. Then, the thickness of at least one of said first and second layers is measured by exposing the recording medium to fluorescent X-rays.

15 Claims, 1 Drawing Sheet

UPPER LAYER (α-ALUMINA)

LOWER LAYER (CHROM. OXIDE)

METHOD FOR MEASURING THICKNESS OF MAGNETIC RECORDING MEDIUM

BACKGROUND OF THE INVENTION

The present invention relates to a method for measuring the thickness of a magnetic recording medium, and particularly to a method for measuring the thickness of a multi-layer film of a magnetic recording medium formed using a simultaneous stratification coating process.

In a magnetic recording medium such as a magnetic tape, magnetic disk, or the like, the number of layers contained within the magnetic recording layer has increased from a single layer to multiple layers in order to increase the recording/reproducing density of the recording layer. For producing such a magnetic recording medium having multiple magnetic recording layers, there are known a process of repeating coating and drying for every layer so as to form multiple recording layers, and a process for forming multiple magnetic recording layers simultaneously with each other. Examples of the latter process are disclosed in Japanese Unexamined Patent Publications (OPIs) Nos. 48-98803, 48-99233, and 62-124631.

In the former process, the thicknesses of each of the layers can readily be determined by carrying out a measurement every time the coating of one layer has been performed. In the latter process (simultaneous stratification coating process), however, it has been very difficult to measure the thicknesses of each of the layers. Conventionally, first the thickness of a sample is measured after only a lower layer has been coated onto the support. Then, the coating of two layers is performed simultaneously, and the total thickness of the two layers is measured and the thickness of the upper layer calculated by subtracting the thickness of the lower layer from the total thickness of the two layers.

In this conventional thickness measurement method, however, there has been a problem in that on-line thickness control cannot be performed during manufacture, and also in that it takes a very long time in the case where the thickness is set at the start (at the initiation of the coating operation) or in the case where the thickness of an upper or lower layer is changed. Further, the measurement process results in production losses, and the measurement is poor in accuracy.

In recording on a magnetic tape, generally the video signal is recorded in the magnetic recording layer close to the surface thereof, while the audio signal is recorded in the whole magnetic recording layer. Therefore, for the production of a video tape having a multi-layer structure, not only is it very important to measure and control the thickness and uniformity of thickness of the uppermost layer, but it is also very important to be able to accurately measure the thickness of the lower layer to thereby measure and control the thickness of the overall recording layer.

In conventional thickness measurement methods such as a method in which a measured amount of transmission or absorption of visible rays or infrared rays is converted into thickness, a method in which the quantity of a designated element (mainly Fe in the case of a magnetic recording material layer) is measured using fluorescent X-rays and converted into thickness, or a method using a contact thickness gauge, however, there has been a problem in that the individual thicknesses of each layer cannot be measured, although the total thickness of the layers can be measured.

SUMMARY OF THE INVENTION

The present invention has been attained in view of the foregoing problems in the prior art, and an object thereof is to provide a method for measuring the thickness of a magnetic recording medium in which, when the thickness of each of layers is set in a simultaneous stratification coating process, the time needed for the measurement is shortened, the manufacturing losses can be reduced, and the accuracy of the measurement is improved.

This and other objects of the present invention have been attained by a method for measuring the thickness of a magnetic recording medium in which, when a multi-layer film constituted by two or more magnetic recording layers is formed on a running nonmagnetic support by a simultaneous stratification coating process, at least one element or compound which can be detected using a fluorescent X-ray analyzing method is not contained commonly in all of the magnetic recording layers, and the amount of a specific element contained in each of the magnetic recording layers is analyzed with fluorescent X-rays to detect the individual thickness of each of the magnetic recording layers. Otherwise, a specific calculated thickness can be subtracted from the total thickness to detect the remainder thickness. Accordingly, thickness control is carried out so as to make the characteristics of each of the magnetic recording layers stable.

That is, the constituent materials of the magnetic recording layers are chosen such that at least one of various elements or compounds which can be distinguished by a fluorescent X-ray analyzing method is not commonly contained in the layers. Thus, measurement can be performed based on the fact that a specified element is present in each of the layers or the fact that a specified element is present only in a designated layer or layers and not the other layers.

Consequently, by measuring the transmission or absorption of fluorescent X-ray intensities peculiar to each layer using a fluorescent X-ray analyzing method and converting the result into a thickness in accordance with a predetermined calibration curve, it is possible to measure the thickness of each of the layers or the thickness of a specified layer. Therefore, in the case of a layer which does not contain the specified element, the thickness of the layer can be calculated by subtracting the thickness of the specified layer from the total thickness.

DESCRIPTION OF THE PREFERRED EMBODIMENTS

Figure 1:
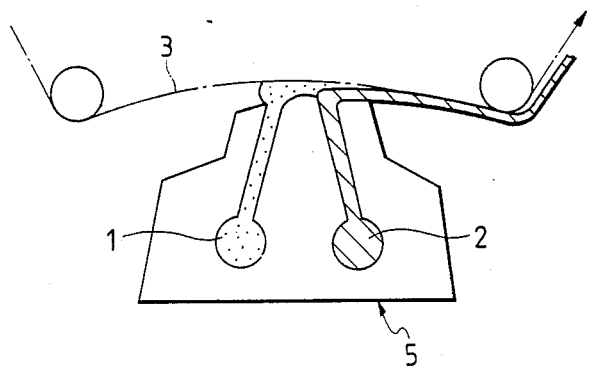
FIG. 1 is a schematic view illustrating a preferred embodiment of a simultaneous stratification coating method according to the present invention.

A description will first be given with respect to a case where the inventive thickness measuring method is applied to a multi-layer magnetic recording medium.

As a first application, a description will be given concerning the case where two magnetic materials which are the same in type but which differ from each other in $H_c$ or $S_{BET}$ are used to form two layers. In this case, the individual thicknesses of each of the layers cannot be measured directly, although the total thickness of the two layers can be measured by detecting the principal component Fe.

Therefore, a target to be analyzed by fluorescent X-rays is required for every layer. The most effective target is an abrasive.

In many cases, conventionally, an abrasive has been added to the whole magnetic layer. If an abrasive is added only to the upper layer and no abrasive is added to the lower layer, however, it is possible to provide distinguishable targets for every layer. Thus, an abrasive is essentially required only for the upper layer. Omission of the abrasive in the lower layer causes an effect that the filling factor, and hence the magnetic characteristics, of the lower layer are improved. Examples of abrasives which can be used in the foregoing method include oxide, nitride, and carbides of chromium, aluminum, titanium, and silicon.

Further, different types of abrasive can be used between the upper and lower layers. In this case, as the abrasive to be added to the lower layer, it is desirable to use any one of the foregoing abrasives except those containing Al compounds, and the amount of the abrasive is selected to be as small as possible, preferably 5% or less relative to the magnetic material, more preferably 3% or less. Further, in view of detection accuracy, it is desirable that the thickness (in μm) multiplied by the proportion of the abrasive (in percent) be 0.5 or more.

Alternatively, it is possible to employ a method in which various compounds composed of various elements are added to the respective layers. In this case, however, it is necessary to take the volumetric percentage of the additive, the filling factor, and the like into consideration so as to maintain the magnetic characteristics of the magnetic tape.

In another application of the invention, the respective layers can be made different from each other in the type of magnetic material. For example, barium ferrite and iron oxide can be used in one layer, while metal and iron oxide are used in another. It is possible to determine the individual thicknesses of each of the layers by detecting the amount of Ba and Fe in the former case, and by detecting the amount of Ni contained the metal and Fe in the latter case.

In yet another application in which the respective layers contain the same type of magnetic material and abrasive, it is possible to determine the individual thicknesses of each of the layers by making the binder different between layers. That is, nitrocellulose and urethane can be used as a binder in the first and second layers and a copolymer of vinyl acetate, vinyl chloride and urethane is used as a binder in the second layer. In this structure, it is possible to obtain the thickness by converting the measured value of the amount of Cl in the vinyl chloride.

Among the various layer structures described above, the most desirable and the most practically effective measure is the method in which an abrasive to be used as a target is added to the upper layer while no abrasive or a small amount of an adhesive different in type from that added to the upper layer is added to the lower layer.

In this case, it has been found that the detection accuracy is good in the range in which the value of $t \times V$ (where t is in and V is in percent) is not less than 0.5, that is, in the range in which $$t \times V \geq 0.5, \qquad (1)$$

where represents the thickness in μm and V represents the ratio of the amount of addition (proportion) of the abrasive to the amount of the magnetic material in percent, that is:

$$V = \frac{\text{amount of abrasive}}{\text{amount of magnetic material}}.$$

Further, it has been found that the detection accuracy is good when detection is performed under the condition that the spot diameter S (mm φ) of the fluorescent X-rays satisfies the following relation depending on the thickness and the amount of addition of the target to be detected:

$$S(mm\ \phi) \geq \frac{2.5}{t(\mu m) \times V(\%)} \qquad (2)$$

Specifically, for example, in the case where the spot diameter is 30 mm and the ratio of the amount of addition is 0.3%, the detection accuracy is very good in a thin layer having a thickness to be detected of 2 μm or less.

Further, a description will be given as to the case where the foregoing condition is applied to the above-discussed first application.

The total thickness of the overall magnetic layer in the simultaneous stratification coating is obtained by measuring Fe, which is common to the upper and lower layers, by the fluorescent X-ray analyzing method. An abrasive containing chromium is added to the upper layer to such an extent that the foregoing expressions (1) and (2) are satisfied. In the thus-arranged structure, the individual thicknesses of each of the upper and lower layers can be measured with high accuracy. This measurement can be rapidly performed, and the thicknesses of each of the upper and lower layers can be continuously monitored during the coating process to make it possible to precisely control the thicknesses of the various layers, thus to provide a high-quality magnetic tape. That is, magnetic tapes can be manufactured in which are eliminated problems such as an increase in noise due to an excessively reduced thickness of the upper layer, an increase in cost due to an excessively increased thickness of the upper layer (which is generally formed of fine particles and therefore expensive), and fluctuations in light concentration due to an imbalance between the upper and lower layers.

As described above, according to the present invention, for simultaneous stratification coating, at least one type of element or compound which can be distinguished by the fluorescent X-ray analyzing method is not common to all the magnetic layers so that a specific element is present in each of the layers or a specific element is present in a predetermined layer while no such element exists in the remaining layers. This arrangement allows the thicknesses of each of the layers to be measured. The thickness measurement can be rapidly performed and the individual thicknesses of each of the layers can be accurately detected and adjusted if necessary. Accordingly, for example, in the production of magnetic tapes (video tapes). it is possible to provide high-quality products in which problems such as an increase in noise due to a reduced thickness of the upper layer, an increase in cost due to an undue increase in thickness of the upper layer, a reduction in quality manifested by color variations due to an imbalance between the respective layers, etc., can be prevented.

In order to make the effects of the present invention clearer, examples of the invention will be described hereunder.

EXAMPLE 1:

Samples (Samples Nos. 1 through 4) shown in Table 2 were prepared by superposing single-layer coatings using an extrusion coating head with coating solutions having the compositions indicated in Table 1, wherein the thicknesses of the first layer, that is, the lower layer (on the base surface side) and the second layer, that is, the upper layer, are different from one another. The thus-prepared samples were subjected to X-ray intensity measurement using fluorescent X-ray analysis (spot diameter of 30 mm $\phi$), thereby forming the calibration curves shown in FIG. 3 (in the case of $\alpha$-alumina) and FIG. 4 (in the case of chromium oxide).

Figure 2:
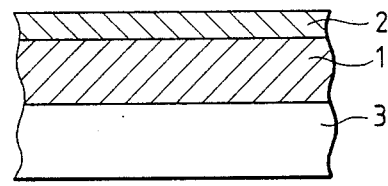
FIG. 2 is an enlarged sectional view showing a multi-layer structure formed according to in the embodiment of FIG. 1.

A magnetic recording medium of the type shown in FIG. 2 having a two-layer structure was formed by simultaneous stratification coating on a support 3 made of 15 $\mu$m polyethylene terephthalate to form lower and upper layers 1 and 2 on the support 3 using an extrusion coating head 5 as shown in FIG. 1. Further, coating was carried out to form a first layer (lower layer) 1 and a second layer (upper layer) 2, with the coating solutions of Table 1, and with the combination shown in Table 3. Then, $\alpha$-alumina and chromium oxide were detected by the fluorescent X-ray analyzing method in the upper and lower layers, respectively, to thereby calculate the thickness of each of the layers from the previously prepared calibration curves (Samples Nos. 5 though 9).

The total of the calculated thicknesses of the respective layers was compared with the measured thickness of the overall layer detected by a contact thickness gauge.

Table 3 shows the results. As seen from Table 3, the thickness detected by the contact thickness gauge was quite the same as the total of the thicknesses of the upper and lower layers separately detected by application of the method according to the present invention. Therefore, the thickness detection technique according to the present invention applied to simultaneous stratification coating results in high reliability to make it possible to produce high-quality magnetic recording media.

TABLE 1

| Material | 1st layer (lower) | 2nd layer (upper) |
| --- | --- | --- |
| Co-$\gamma$FeO $\times$ SBET (30 m$^2$/g) | 100 weight portions | — |
| Co-$\gamma$FeO $\times$ SBET (50 m$^2$/g) | — | 100 weight portions |
| copolymer of vinyl chloride and vinyl acetate (400 $\times$ 110A produced by Nippon Zeon Co., Ltd.) | 12 weight portions | 12 weight portions |
| polyurethane resin (NIPPOLLAN N2301 produced by Nippon Polyurethane Industry Co., Ltd.) | 6 weight portions | 6 weight portions |
| polyisocyanate compound (CORONATEL produced by Nippon Polyurethane Industry Co., Ltd.) | 12 weight portions | 12 weight portions |
| carbon black mean particle size 40 m$\mu$ | 8 weight portions | 8 weight portions |
| myristic acid | 2 weight | 2 weight |

TABLE 1-continued

| Material | 1st layer (lower) | 2nd layer (upper) |
| --- | --- | --- |
| oleic acid modified silicone | 2 weight portions | 2 weight portions |
| Cr$_2$O$_3$ | 6 weight portions | — |
| $\alpha$-alumina | — | 6 weight portions |
| methyl ethyl ketone | 200 weight portions | 200 weight portions |
| butyl acetate | 100 weight portions | 100 weight portions |

TABLE 2

| Sample No. | No. 1 | No. 2 | No. 3 | No. 4 |
| --- | --- | --- | --- | --- |
| lower layer coating amount (cc/m$^2$) | 20 | 17.5 | 12.5 | 7.5 |
| upper layer coating amount (cc/m$^2$) | 2.5 | 5 | 10 | 15 |
| lower layer thickness (contact thickness meter) | 4 | 3.5 | 2.5 | 1.5 |
| upper-lower layer total thickness (contact thickness meter) | 4.5 | 4.5 | 4.5 | 4.5 |
| upper thickness (total - lower thickness) | 0.5 | 1.0 | 2.0 | 3.0 |

TABLE 3

| Sample No. | No. 5 | No. 6 | No. 7 | No. 8 | No. 9 |
| --- | --- | --- | --- | --- | --- |
| lower layer coating amount (cc/m$^2$) | 15 | 15 | 20 | 20 | 20 |
| upper layer coating amount (cc/m$^2$) | 5 | 3 | 10 | 5 | 3 |
| lower layer thickness | 3.0 | 3.0 | 4.0 | 4.0 | 4.0 |
| upper layer thickness | 1.0 | 0.6 | 2.0 | 1.0 | 0.6 |
| upper layer thickness plus lower layer thickness | 4.0 | 3.6 | 6.0 | 5.0 | 4.6 |
| upper-lower layer total thickness (comparative example) | 4.0 | 3.8 | 6.0 | 5.0 | 4.8 |

NOTE:
All thicknesses in Tables 1 and 2 are in $\mu$m.

EXAMPLE 2

Coating was performed with the coating solutions shown in Table 4 using the same coating apparatus as that used in Example 1 to thereby form a first layer as the lower layer 1 and a second layer as the upper layer 2.

Figure 3:
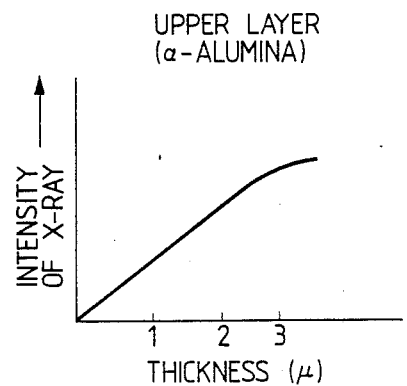
FIGS. 3 and 4 are graphs showing calibration curves obtained by fluorescent X-ray analysis.
Figure 4:
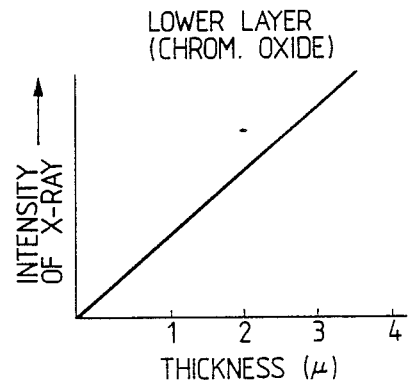

Similar to Example 1, a calibration curve for chromium dioxide (a calibration curve derived from the X-ray intensity with respect to only the upper layer) was assembled by performing single-layer coating twice (see FIG. 3).

Next, coating was performed using the simultaneous stratification method so as to form an upper layer of a coating amount of 10 cc/m$^2$ and a lower layer of 20 cc/m$^2$. The thickness of the upper layer was obtained from the calibration curve, and the thickness of the lower layer was obtained by subtracting the thickness of the upper layer from the total thickness.

RESULTS upper layer—2.0 $\mu$m
lower layer—4.0 $\mu$m total—6.0 μm

The upper and lower layers were thus sufficiently suitable for determining the relation between the amount of coating and the thickness obtained from the calibration curve in the case of the single layer.

TABLE 4

| Material | 1st layer (lower layer) | 2nd layer (upper layer) |
|---|---|---|
| Co - γFeO × SBET (30 m²/g) | 100 weight portions | — |
| Co - γFeO × SBET (50 m²/g) | — | 100 weight portions |
| copolymer of vinyl chloride and vinyl acetate (400 × 110A produced by Nippon Zeon Co., Ltd.) | 12 weight portions | 12 weight portions |
| polyurethane resin (NIPPOLLAN N2301 produced by Nippon Polyurethane Industry Co., Ltd.) | 6 weight portions | 6 weight portions |
| polyisocyanate compound (CORONATEL produced by Nippon Polyurethane Industry Co., Ltd.) | 12 weight portions | 12 weight portions |
| carbon black mean particle size 40 mμ | 8 weight portions | 8 weight portions |
| myristic acid | 2 weight portions | 2 weight portions |
| oleic acid modified silicone | 2 weight portions | 2 weight portions |
| Cr₂O₃ | — | 6 weight portions |
| methyl ethyl ketone | 200 weight portions | 200 weight portions |
| butyl acetate | 100 weight portions | 100 weight portions |

EXAMPLE 3

The same test as in Example 2 was performed while varying the amount of addition of chromium oxide ($Cr_2O_3$) and the spot diameter of the fluorescent X-rays.

Calibration curves were produced with respect to the various values of the spot diameter and the amount of addition using samples formed by two single-layer coatings in the same manner as in Example 2. Samples Nos. 10 through 24 were formed by simultaneous stratification coating with the coating amounts shown in Table 5. The thickness (t) of the upper layer was measured.

As a result, it was found that even if the amount of coating of the upper layer is fixed (the thickness is fixed), the detection accuracy is poor if the value of $t \times V$ is smaller than 0.5, as shown by Sample No. 10, and the detection accuracy is poor also in the case where the following relation is not satisfied as shown in Samples Nos. 20 through 24.

$$S \geq \frac{2.5}{t \times V}$$

TABLE 5

| Sample No. | coating amount of lower layer | coating amount & thickness of upper layer (t μm) | additive amount of $Cr_2O_3$ (V %) | fluorescent X-ray spot size S (mm φ) | thickness (μm) of upper layer by fluorescent X-rays | evaluation G = Good N = No Good |
|---|---|---|---|---|---|---|
| No. 10 | 20 cc/m² | 5 cc/m² (1.0 μm) | 0.1 | 30 | 0.7 | N |
| No. 11 | " | 5 cc/m² (1.0 μm) | 0.5 | " | 1.0 | G |
| No. 12 | " | 5 cc/m² (1.0 μm) | 1 | " | 1.0 | G |
| No. 13 | " | 5 cc/m² (1.0 μm) | 5 | " | 1.0 | G |
| No. 14 | " | 5 cc/m² (1.0 μm) | 10 | " | 1.0 | G |
| No. 15 | " | 5 cc/m² (1.0 μm) | 1 | 20 | 1.0 | G |
| No. 16 | " | 5 cc/m² (1.0 μm) | " | 10 | 1.0 | G |
| No. 17 | " | 5 cc/m² (1.0 μm) | " | 5 | 1.0 | G |
| No. 18 | " | 5 cc/m² (1.0 μm) | " | 2.5 | 1.0 | G |
| No. 19 | " | 5 cc/m² (1.0 μm) | " | 1 | 0.8 | N |
| No. 20 | " | 10 (2.0 μm) | 0.05 | 20 | 0.6 | N |
| No. 21 | " | 10 (2.0 μm) | 0.1 | 10 | 0.7 | N |
| No. 22 | " | 10 (2.0 μm) | 0.25 | 3 | 1.0 | N |
| No. 23 | " | 10 (2.0 μm) | 0.5 | 2 | 1.0 | N |
| No. 24 | " | 10 (2.0 μm) | 1 | 1 | 1.0 | N |

What is claimed is:

1. A method for measuring the thickness of a magnetic recording medium, comprising the steps of:
   simultaneously coating first and second magnetic layers onto a running nonmagnetic support to form said recording medium, said first and second magnetic layers having different responses to fluorescent X-rays; and
   measuring the thickness of at least one of said first and second layers by providing in advance a calibration curve of thickness versus intensity of transmitted fluorescent X-rays, exposing said recording medium to fluorescent X-rays, measuring an intensity of said fluorescent X-rays transmitted through said recording medium, and determining said thickness from said calibration curve using the measured intensity.

2. The method of claim 1, wherein said first layer contains an abrasive and said second layer contains no abrasive, said first layer being an upper layer and said second layer being a lower layer.

3. The method of claim 2, wherein a thickness in μm of said first layer multiplied by a portion by weight in percent of said abrasive relative to a total weight of magnetic material of said first layer is 0.5 or more.

4. The method of claim 3, wherein a spot diameter S in mm of said fluorescent X-rays is given by:

$$S(mm\ \phi) \geq \frac{2.5}{t(\mu m) \times V(\%)}$$

where t is said thickness in μm of said first layer and V is said portion by weight in percent of said abrasive.

5. The method of claim 2, wherein said abrasive is selected from the group consisting of oxides, nitrides, and carbides of chromium, aluminum, titanium, and silicon.

6. The method of claim 1, wherein said first layer contains a first abrasive and said second layer contains a second abrasive different from said first abrasive, said first layer being an upper layer and said second layer being a lower layer.

7. The method of claim 6, wherein said first abrasive is selected is selected from the group consisting of oxides, nitrides, and carbides of chromium, aluminum, titanium, and silicon, and said second abrasive is selected from the group consisting of oxides, nitrides, and carbides of chromium, titanium, and silicon.

8. The method of claim 7, wherein said first abrasive is present in an amount of 5% or less by weight of a total weight of magnetic material of said first layer.

9. The method of claim 7, wherein said first abrasive is present in an amount of 3% or less by weight of a total weight of magnetic material of said first layer.

10. The method of claim 7, wherein a thickness in μm of said first layer multiplied by an portion by weight in percent of said first abrasive relative to a total weight of magnetic material of said first layer is 0.5 or more.

11. The method of claim 1, wherein said first and second layers are made of different magnetic materials.

12. The method of claim 11, wherein said first layer contains barium ferrite and iron oxide, and said second layer contains a metal including nickel and iron oxide.

13. The method of claim 1, wherein said first and second layers contain different binders.

14. The method of claim 13, wherein said first layer contains nitrocellulose and urethane as a binder, and said second layer contains a copolymer of vinyl acetate, vinyl chloride and urethane as a binder.

15. The method of claim 1, wherein said measuring step comprises measuring the thicknesses separately of said first and second layers.

* * * * *